United States Patent [19]

Berecz et al.

[11] Patent Number: 4,687,395
[45] Date of Patent: Aug. 18, 1987

[54] COMPOSITE RIVET WITH DEFORMABLE ANNULAR COLLAR CONTAINING RANDOMLY CHOPPED FIBERS

[75] Inventors: Imre Berecz, El Toro; Dennis L. Hinton, Yorba Linda, both of Calif.

[73] Assignee: Microdot Inc., Darien, Conn.

[21] Appl. No.: 738,958

[22] Filed: May 29, 1985

[51] Int. Cl.$^4$ .............................................. F16B 19/00
[52] U.S. Cl. ................... 411/361; 411/363; 411/501; 411/503; 411/901; 244/132
[58] Field of Search ............... 411/361, 377, 501, 503, 411/508, 509, 900–903, 907, 908, 363; 244/132

[56] References Cited

U.S. PATENT DOCUMENTS

| | | | |
|---|---|---|---|
| 3,354,260 | 11/1967 | Brandt et al. | 411/909 X |
| 3,544,143 | 12/1970 | Ohlsson | 411/501 X |
| 4,143,580 | 3/1979 | Luhm | 411/45 |
| 4,230,017 | 10/1980 | Angelosanto | 411/361 X |
| 4,405,256 | 9/1983 | King, Jr. | 411/360 X |
| 4,478,543 | 10/1984 | Lyon | 411/908 X |
| 4,478,544 | 10/1984 | Strand | 411/908 X |

Primary Examiner—Peter A. Nelson
Attorney, Agent, or Firm—Lyman R. Lyon

[57] ABSTRACT

A composite rivet comprises a preformed head portion, a shear portion, an integral mandrel extending from said shear portion having an annular recess therein, a deformable plastic locking ring radially aligned with and filling the recess in said mandrel, and a collar telescoped about and radially aligned with said locking ring for controlling deformation thereof.

1 Claim, 6 Drawing Figures

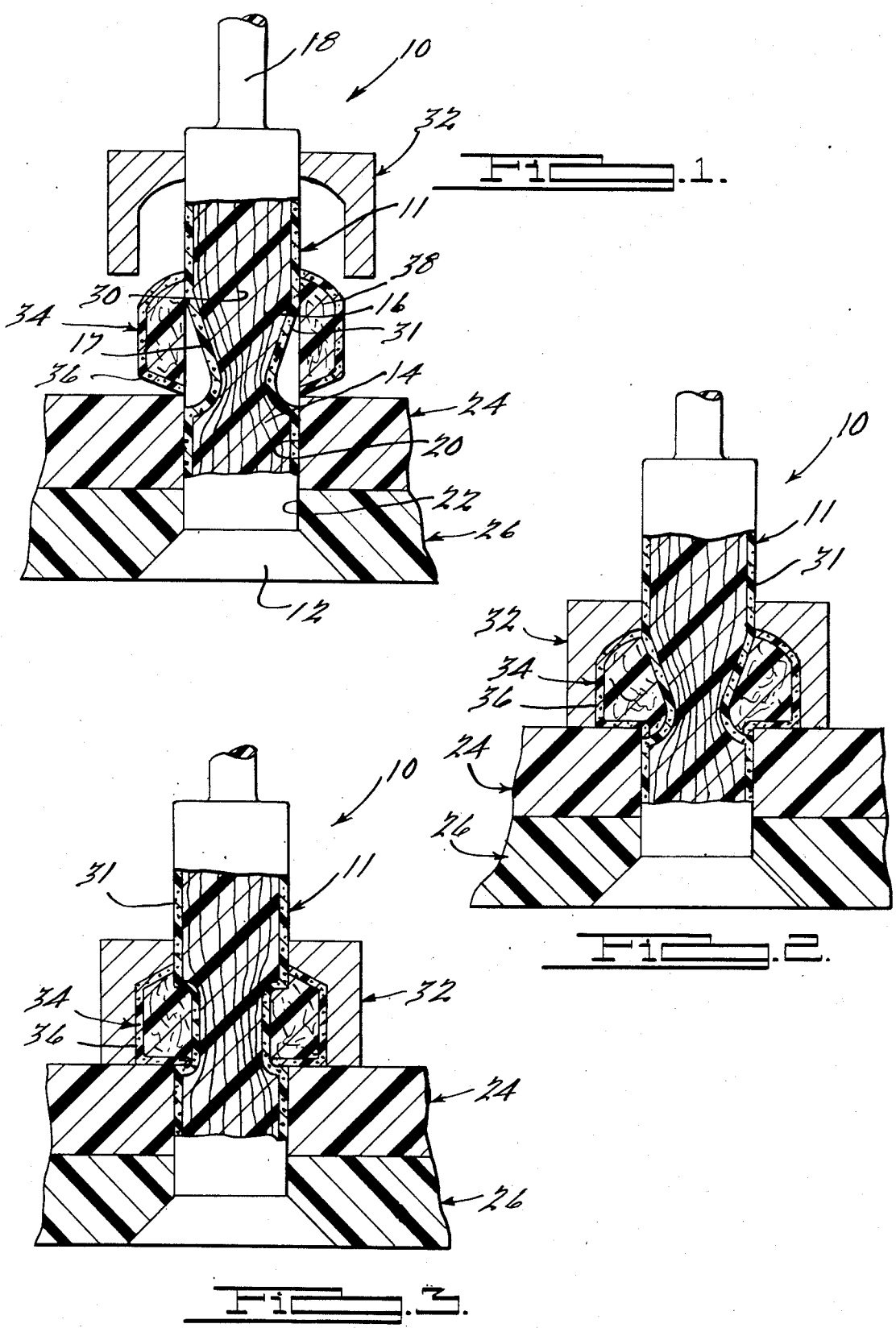

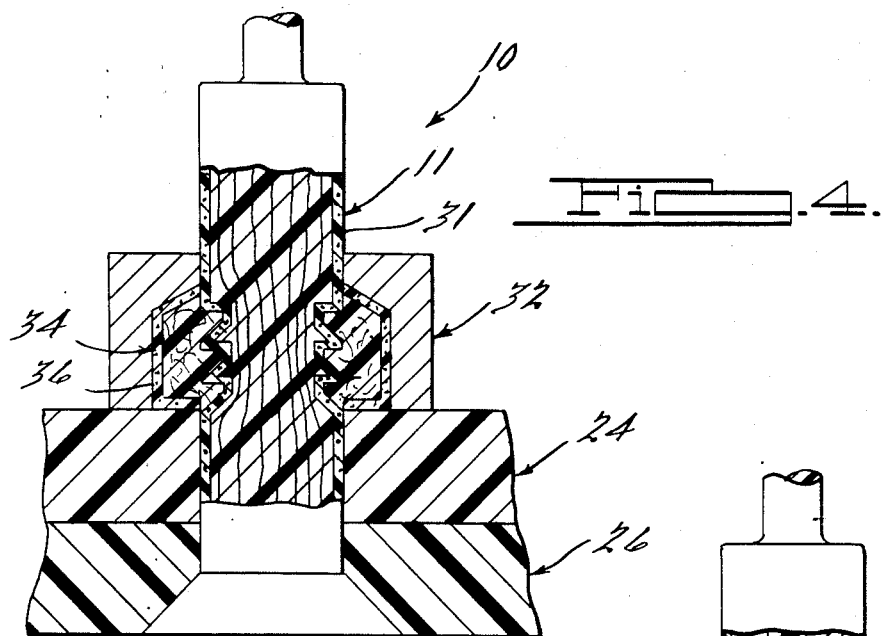
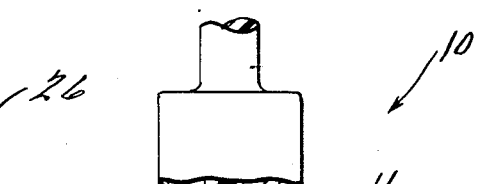
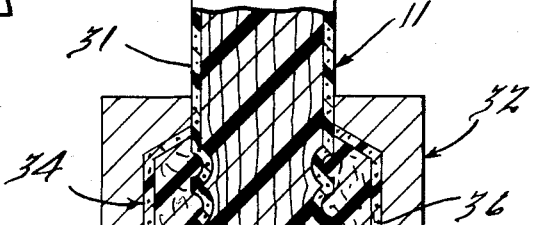
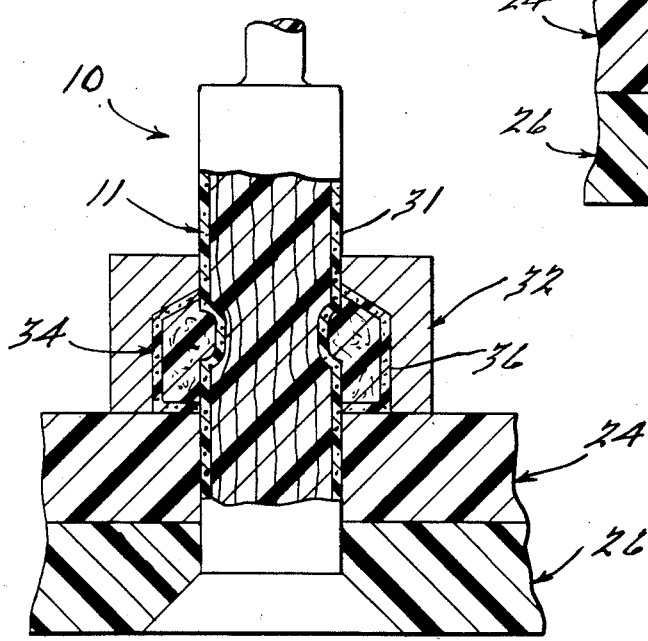

COMPOSITE RIVET WITH DEFORMABLE ANNULAR COLLAR CONTAINING RANDOMLY CHOPPED FIBERS

BACKGROUND OF THE INVENTION

The rivet of the instant invention is an improvement on the composite rivet disclosed in U.S. Pat. No. 4,478,544 issued Oct. 23, 1984, for Composite Rivet, and assigned to the assignee hereof.

Carbon fiber reinforced materials are widely used in the aircraft industry for airframe structural components. However, the use of carbon fiber reinforced resins in rivets has heretofore been limited by the difficulty of efficiently forming the rivet heads.

SUMMARY OF THE INVENTION

The aforesaid problem is solved by providing the rivet with an integral mandrel on the back side thereof that is tensioned relative to a workpiece. Compression of a collar, comprising a chopped fiber core with a woven fiber sheath set in a resin matrix, into an annular groove of the rivet is accomplished by a suitable tool and is enabled by the use of a thermoplastic or "B"-stage thermoset resin matrix, which is softened due to the application of heat. The collar, in combination with a radially extending rivet head on the opposite end of the rivet, forms a riveted connection that exhibits relatively high shear and tension strength.

BRIEF DESCRIPTION OF THE DRAWINGS

FIG. 1 is an elevational view, partially in cross section, of one embodiment of the rivet of the instant invention;

FIG. 2 is a view of the rivet of FIG. 1 after advancement of a forming tool concurrently with tensioning of the rivet mandrel to form a head on the installed rivet;

FIG. 3 is a view similar to FIG. 1 of another embodiment of the instant invention;

FIG. 4 is a view similar to FIG. 1 of another embodiment of the instant invention;

FIG. 5 is a view similar to FIG. 1 of another embodiment of the instant invention; and FIG. 6 is a view similar to FIG. 1 of another embodiment of the instant invention.

DETAILED DESCRIPTION OF THE PREFERRED EMBODIMENT OF THE INVENTION

As best seen in FIG. 1 of the drawings, a rivet 10 in accordance with a constructed embodiment of the instant invention comprises a thermoset resin rivet body 11 having a preformed head portion 12, a shear portion 14, a locking portion 16 having an annular groove 17 therein, and an integral mandrel 18. The mandrel 18 facilitates tensioning of the rivet 10. The shear portion 14 of the rivet body 11 extends through complementary apertures 20 and 22 in a pair of workpieces 24 and 26, respectively. The rivet body 11 is reinforced internally by parallel carbon fibers 30 and externally by a woven or braided fiber sheath 31 on the outer periphery thereof.

As seen by comparing FIG. 1 with FIG. 2 of the drawings, the mandrel 18 of the rivet body 11 is adapted to be pulled upwardly by a tool (not shown) of conventional design while a tool 32 is concomitantly biased downwardly against a collar 34. The collar 34 has a sheath 36 comprising woven, braided, or circumferentially directed fibers disposed about chopped fibers 38 and set in a thermoplastic or "B"-stage thermoset resin matrix. Downward pressure of the tool 32 results in deformation of the collar 34 into the configuration shown in FIG. 2, thereby filling the groove 17 in the locking portion 16 of the rivet body 11.

In accordance with one feature of the instant invention, only the thermoplastic of "B"-stage resin matrix of the collar 34 need be softened by the application of heat by, for example, direct heating or preheat of the tool 32.

A relatively smooth exterior surface is developed on the collar 34 due to the sheath 36 thereof. Clamp-up force of the rivet 10 on the workpieces 24 and 26, in conjunction with the head 12 of the rivet 10, is maintained by the inwardly convergent configuration of the groove 17 in the preform 11.

The embodiments of FIGS. 3-6 are similar to the rivet of FIGS. 1 and 2 except for the cross-sectional configuration of the annular groove 17 in the locking portion 16 of the rivet body 11. In each case, the collar 34 is deformed into the groove 17 to achieve and maintain clamp-up of the workpieces 24 and 26. Moreover, it is to be noted that, in each embodiment, the sheath 36 on the collar 34 extends into engagement with the sheath 31 on the rivet body 11 to preclude protrusion of the fibers 38 of the collar 34.

While the preferred embodiment of the invention has been disclosed, it should be appreciated that the invention is susceptible of modification without departing from the scope of the following claims.

We claim:

1. A composite rivet comprising an elongated one-piece body having an integral head portion, an integral shear portion, and an integral mandrel extending from said shear portion having an annular recess therein, and
   a deformable annular plastic collar separate from the head and shear portions of said rivet and comprising chopped randomly orientated fibers encapsulated by a sheath of circumferentially extending continuous fibers set in a thermoplastic matrix, said collar having an initial inside diameter substantially equal to the initial outside diameter of said shear portion, said collar being deformable radially inwardly so as to be radially aligned with and fill the recess in said mandrel, the sheath on said collar directly engaging said mandrel to preclude protrusion of the chopped fibers of said collar.

* * * * *